United States Patent
Mathew et al.

(10) Patent No.: US 11,874,834 B2
(45) Date of Patent: Jan. 16, 2024

(54) DETERMINING DIMENSION TABLES FOR STAR SCHEMA JOINS

(71) Applicant: HEWLETT PACKARD ENTERPRISE DEVELOPMENT LP, Houston, TX (US)

(72) Inventors: Shine Mathew, Karnataka (IN); Ashish Dange, Karnataka (IN); Harsh Singh, Karnataka (IN); Javeed Pasha, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 26 days.

(21) Appl. No.: 17/588,543

(22) Filed: Jan. 31, 2022

(65) Prior Publication Data

US 2023/0244666 A1      Aug. 3, 2023

(51) Int. Cl.
| | |
|---|---|
| *G06F 16/245* | (2019.01) |
| *G06F 16/2453* | (2019.01) |
| *G06F 16/2455* | (2019.01) |

(52) U.S. Cl.
CPC .... *G06F 16/24544* (2019.01); *G06F 16/2456* (2019.01)

(58) Field of Classification Search
None
See application file for complete search history.

(56) References Cited

U.S. PATENT DOCUMENTS

| | | | | |
|---|---|---|---|---|
| 5,960,428 | A  * | 9/1999 | Lindsay | G06F 16/24544 |
| 6,446,063 | B1 * | 9/2002 | Chen | G06F 16/24544 |
| 6,618,729 | B1 * | 9/2003 | Bhashyam | G06F 16/2237 |
| 8,086,598 | B1 | 12/2011 | Lamb | |
| 9,836,505 | B2 | 12/2017 | Cheng | |
| 2006/0036637 | A1* | 2/2006 | Sayal | G06F 16/283 707/999.102 |
| 2007/0061288 | A1* | 3/2007 | Fuh | G06F 16/24544 |
| 2007/0136346 | A1* | 6/2007 | Morris | G06F 16/24561 |
| 2013/0275364 | A1* | 10/2013 | Wang | G06F 16/283 707/E17.014 |
| 2016/0350371 | A1* | 12/2016 | Das | G06F 16/258 |

\* cited by examiner

*Primary Examiner* — Son T Hoang
(74) *Attorney, Agent, or Firm* — Yao Legal Services, Inc.

(57) ABSTRACT

A process includes accessing a query that is associated with joining a fact table with a plurality of dimension tables. The fact table includes a primary key that includes a set of columns, which are covered by the dimension tables. The process includes determining a query plan for processing the query. The query plan has an associated join order. Determining the query plan includes determining a plurality of sets of the plurality of dimension tables, where each set includes dimension tables, which cover the set of columns of the primary key. Determining the query plan includes evaluating costs that are associated with joining subsets of the plurality of sets with the fact table. Based on the costs, a given subset of the plurality of subsets is selected. Determining the query plan includes constraining the join order based on the given subset so that the dimension tables of the given subset are joined before the fact table.

20 Claims, 7 Drawing Sheets

DETERMINING DIMENSION TABLES FOR STAR SCHEMA JOINS

BACKGROUND

A typical business enterprise may have organized collections of data, or databases, and for purposes of managing the storage, modification and retrieval of the corresponding data, the business enterprise may have set of software called a "database management system," or "DBMS." As an example, the databases may be relational databases. In a relational database, the data is stored in tables, and each table is organized in rows and columns. Tables in a relational database may be related based on data common to the tables. The business enterprise may use a set of software, called a "relational DBMS," or "RDBMS," to access the relational database for purposes of storing, retrieving and modifying data. More specifically, data of the relational database may be accessed through use of requests, or queries. The queries may, for example, be query statements that are structured according to a particular format (e.g., a structured query language (SQL) query format). As an example, a SQL query statement may contain a SELECT command to request information from one or multiple tables of a relational database and return the requested information in the form of a new table.

DETAILED DESCRIPTION

Figure 1:
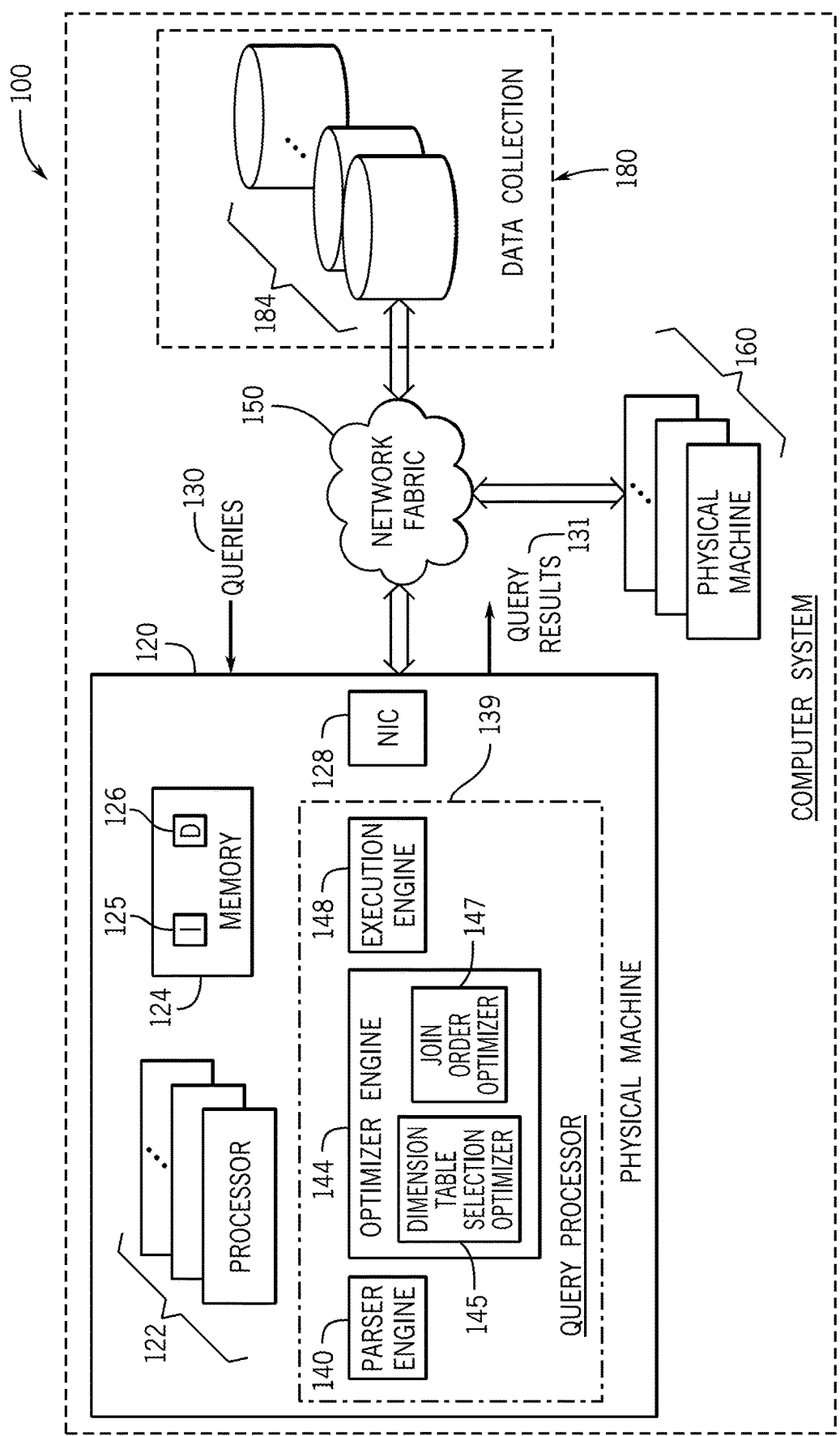
FIG. 1 is a schematic diagram of a computer system having a dimension table selection optimizer to optimize query plans for star schema-based queries according to an example implementation.

An RDBMS may contain a query processor that executes operations to access, store and modify data in a relational database in response to queries that are received by the RDBMS. More specifically, the query processor may, for a given query statement (e.g., a SQL query statement) that represents a query, transform the query statement into a sequence of operations according to a query plan; and the query processor may then execute the sequence of operations to provide a query result.

A query statement may be represented as an expression of one or multiple relational algebraic operators (e.g., set operators, such as union and intersection operators and relational operators, such as join and select operators) and one or multiple aggregation operators (e.g., sort by and group by operators). Moreover, the expression may be represented by a relational expression tree. The internal nodes of the relational expression tree represent the operators, and the leaves of the relational expression tree represents relations. For example, a SQL JOIN of Table A and Table B may be represented, in a relational expression tree, by a JOIN node that has one leaf representing Table A and another leaf representing Table B.

In general, a query statement may potentially be processed in many different ways by the query processor, and each of these ways may be referred to as a potential, or candidate, "query plan." In this context, a "query plan" generally refers to a sequence of operations that are executed in response to a query (e.g., a query expressed as a query statement) to provide a result (herein called a "query result"). A query plan may be represented by a relational expression tree, with each operator of the relational expression tree being annotated with additional information, such as an algorithm and index to be used in the execution of the operator.

The query processor may contain a query optimizer (also called a "query optimizer engine" or "optimizer engine" herein), which may, for a given query, select a query plan, which is then executed by an execution engine of the query processor. The selected query plan may be one of potential multiple query plans that could be executed to provide a query result. These alternative query plans, although providing the same query result, may be associated with different query execution performances. For example, the execution of query plan A may be associated with a relatively large allocated memory footprint due to a relatively large number of rows, or records, that are processed in arriving at the final query result. The execution of query plan B may be associated with a relatively longer processing time due to a relatively large number of operators; the execution of query plan C may be associated with a relatively large allocated memory footprint and processing time; and so forth.

In accordance with example implementations, a goal of the query optimizer is to, for a given query, determine or select a query plan (called an "optimal query plan") that may be efficiently executed by the execution engine. In this context, the efficient execution of the query plan may be measured by any of a number of performance criteria alone or in combination, such as a memory allocation, a processing time, as well as other and/or different performance criteria.

As an example, a query statement may contain a join command that requests the combining of records, or rows, of multiple tables. In SQL, there are six types of joins, including the following: an inner join, which may be invoked using an INNER JOIN command (or a JOIN command with the use of "INNER" being optional); a left outer join command, which may be invoked using a LEFT OUTER JOIN command (or a LEFT JOIN command with the use of "OUTER" being optional); a right outer join, which may be invoked using a RIGHT OUTER JOIN command (or a RIGHT JOIN command with the "OUTER" being optional); and a full join which may be invoked using the FULL JOIN command. It is noted that an inner join may also be invoked without an explicit INNER JOIN or JOIN command when multiple tables following the FROM keyword in the SQL query statement. SQL also includes a SEMI JOIN and ANTI SEMI JOIN.

A given query plan may have one or multiple join operators. A given join operator may be a single join operator or a multiple join operator (also called a "multi-join operator" or "multi-join" herein). A single join operator corresponds to a join of two tables. A multiple join operator corresponds to a join of three or more tables. For the query plan, a multiple join corresponds to multiple single join operator joins, where each single join operator joins two tables. A given query statement may specify a multiple join of three or more tables but not specify the particular join order, i.e., specify how the tables are joined via single join operators. There may be many ways in which multiple tables may be joined. Although, regardless of the join order selected, the same number of records are returned in the final query result, the particular join order may have a significant impact on the overall query processing performance. In this manner, the particular join order affects the number of intermediate records that are returned and processed by the query processor in arriving at the final query result.

The query processor may determine a query plan for a given query statement based on a schema pattern associated with the query statement. Here, the "schema" refers to a database organizational structure. A given query statement may have an associated specific schema, and the query optimizer may optimize the corresponding query plan based on the schema. For example, one type of query (called a "star schema query" or "star schema-based query" herein) adheres to a star pattern. More specifically, the star schema query specifies dimension tables having predicates, or conditions, on all or most of the columns of the primary key of a fact table. In this context, a "primary key" of a table refers to a set of one or multiple columns of the table, which uniquely identify rows of the table. In this context, a "star schema query" refers to a query to one or multiple fact tables, where the fact table(s) reference a group of dimension tables. Here, a dimension table references one or multiple attributes of the fact table.

As an example, a star schema query may be directed to a SALES table, an ORDERS table, a PRODUCT table, a STORE table, and a CUSTOMER table which are defined as follows:

SALES⇒(ORDER_ID, PRODUCT_ID, STORE_ID, CUST_ID, PRODUCT_PRICE, DISCOUNT)

ORDERS⇒(ORDER_ID, TOTAL_BILL_AMT, PYMNT_METHOD, ORDER_TIME)

PRODUCT⇒(PRODUCT_ID, PRODUCT_NAME, MANUFACTURER, BATCH_NO, EXP_DATE)

STORE⇒(STORE_ID, STORE_NAME, STORE_ADD, STORE_CONTACT)

CUSTOMER⇒(CUST_ID, CUSTOMER_NAME, MOBILE, ADDRESS, REWARD_PTS)

For a star schema-based query, one or more fact tables reference dimension tables. For example, for the tables that are set forth above, the SALES table is the largest table (i.e., the table having the largest number of records, or rows) among the tables and may be considered a "fact table," in accordance with star schema terminology. Here, the SALES table is the center, with edges extending to the other dimension tables to form a snowflake, or star pattern. In general, a dimension table provides records, or rows, which correspond to attributes of a fact table.

Here, the ORDERS table, the PRODUCT table, the STORE table and the CUSTOMER table provide records corresponding to attributes of the SALES table. For this example, the following column names of the SALES table are considered part of the primary key of the SALES table:

(ORDER_ID, PRODUCT_ID, STORE_ID, CUST_ID)

The following example star schema-based query statement (or "star schema-based query") may be directed to the example fact and dimension tables above:

SELECT STORE_ID, PRODUCT_NAME, TOTAL_BILL_AMT, CUSTOMER_NAME FROM SALES S, ORDERS O,

PRODUCT P, STORE ST, CUSTOMER C WHERE S.ORDER_ID=O.ORDER_ID AND S.PRODUCT_ID=

P.PRODUCT_ID AND S.STORE_ID=ST.STORE_ID AND S.CUST_ID=C.CUST_ID

This example query statement has a star schema pattern, as the dimension tables have predicates on all of the columns of the primary key of the SALES fact table. In other words, each dimension table has an edge to the SALES fact table.

In general, when, for a given query, all of the dimension tables have predicates on all of the columns of the primary key of the fact table, as in the example above, all of the dimension tables are joined together before the fact table is accessed or scanned, based on the predicate(s) set forth in the query statement. Therefore, for the example above, because the dimension tables have predicates on all of the columns of the primary key of the SALES fact table, all of the ORDERS, PRODUCT, STORE and CUSTOMER dimension tables are joined together before the SALES fact table is accessed. A query plan for processing such a query statement may yield the best performance when all of the dimension tables are read first and then joined with the SALES fact table using a "nested loop join." For the example above, a pointed-look up may be made into the SALES fact table for the records that are to be projected.

The foregoing example is rather simplistic in nature, and in practice, star schema-based queries are relatively more complex and have significantly larger numbers of dimension tables to be joined. A given star schema-based query may be directed to a set of dimension tables, where more than one dimension table may cover the same column(s) of the primary key of the fact table. Moreover, a given star schema-based query may be directed to a set of dimension tables that do not cover one or multiple columns of the fact table's primary key.

The goal of optimizing the processing of a star schema-based query is to minimize the overall data movement while returning the query result in a relatively minimum time period. One approach to optimizing a star schema-based query plan is to apply a join enumeration technique to evaluate the costs associated with different candidate join orders and identify the candidate join order that has the lowest associated cost. However, such an approach may be relatively expensive in terms of computing resources (central processing unit (CPU) resources, memory usage, and so forth).

Another approach to optimize a star schema-based query plan may involve applying specialized algorithms specifically directed to star schema-based query processing. For example, a particular algorithm may be selected based on the specific arrangement of the dimension tables and the fact table in the query. With this approach, however, an optimal solution is predicted before the optimal solution for the sub-problems, or plan fragments, are identified. As such, this approach does not guarantee optimality due to the overall solution being determined before the sub-problems, or sub-solutions, are optimized.

In accordance with example implementations that are described herein, a query plan for a star schema-based query is determined by identifying an optimal set of dimension tables to join before the fact table in the query plan. Stated differently, in accordance with example implementations, not all of the dimension tables may be joined before the fact table is joined. Instead, a specific dimension table subset (i.e., a set of dimension tables fewer in number than the total number of dimension tables) are selected to be joined first and then joined with the fact table. The other remaining dimension tables may then be arranged to achieve an optimal join order and then joined to the query plan produced by joining of the selected dimension table subset and fact table. Moreover, in accordance with example implementations, the join order of the identified dimension tables may be subsequently determined after the subset of the dimension tables is identified.

More specifically, in accordance with example implementations, a star schema-based query may be directed to a group of dimension tables and a fact table. More than one dimension table may cover the same column(s) of the primary key of the fact table. Stated differently, more than one combination of dimension tables may be joined with the fact table to produce a result for the query. In accordance with example implementations, an optimizer considers costs of different subsets of dimension tables of the combinations to select a subset of dimension tables of a particular combination, where the selected subset has the lowest associated cost. The optimizer constrains the query plan to place the selected subset of dimension tables before the fact table in the query plan. In other words, the dimension tables of the subset are joined before the result of this join is joined with the fact table. Pursuant to the query plan determined by the optimizer, the remaining dimension table(s) of the corresponding combination of dimension tables are joined after the fact table.

As a more specific example, FIG. 1 depicts a computer system 100, such as a computer system that may be used as part of a DBMS. In accordance with example implementations, the computer system 100 includes a physical machine 120 that includes hardware and software components. As examples, the physical machine 120 may be a desktop computer, a server, a client, one or multiple rack-based computer units, one or multiple blade servers, and so forth.

In accordance with example implementations, the hardware components of the physical machine 120 include one or multiple processors 122 (e.g., one or multiple CPUs, one or multiple CPU processing cores, one or multiple CPU semiconductor packages (or "chips"), and so forth); a memory 124; and one or multiple network interface cards (NICs) 128. The physical machine 120 may contain various other hardware components that are not depicted in FIG. 1, such as accelerators, bridge chips, bus interfaces, input/output (I/O) devices, and so forth.

In general, the memory 124 contains non-transitory memory devices, such as semiconductor storage devices, flash memory devices, memristors, phase change memory devices, a combination of one or more of the foregoing storage technologies, and so forth. Moreover, the memory devices may be volatile memory devices (e.g., dynamic random access memory (DRAM) devices, static random access (SRAM) devices, and so forth) and/or non-volatile memory devices (e.g., flash memory devices, read only memory (ROM) devices and so forth).

In accordance with example implementations, the software components of the physical machine 120 include a query processor 139 that processes incoming database requests, or queries 130, to provide corresponding query results 131. In this context, a "query" represents a request to store, retrieve or modify data stored in a database, such as a database of a data collection 180. The queries 130 may be represented by corresponding query statements. The physical machine 120 may have various other software components that are not depicted in FIG. 1, such as an operating system, device drives, firmware, libraries, and so forth.

The data collection 180 represents one or multiple databases 184. As depicted in FIG. 1, in accordance with example implementations, the data collection 180 is external to the physical machine 120, i.e., the databases 184 is connected to the physical machine 120 via network fabric 150. In general, the network fabric 150 may include components and use protocols that are associated with one or multiple types of communication networks, such as (as examples) Fiber Channel networks, iSCSI networks, ATA over Ethernet (AoE) networks, HyperSCSI networks, local area networks (LANs), wide area networks (WANs), global networks (e.g., the Internet), wireless networks, remote direct memory access (RDMA) networks, or any combination thereof. The databases 184 may form a distributed database, i.e., a database that is distributed on multiple computing and/or storage nodes and connected to the physical machine 120 via the network fabric 150. In accordance with some implementations, the databases 184 may be stored on storage devices that are connected by one or multiple buses to the components of the physical machine 120. In accordance with some example implementations, the databases 184 may be stored in whole or in part on one or multiple storage devices (e.g., persistent memory devices, mass storage drives, and so forth, of the physical machine 120) of the physical machine 120. As such, depending on the particular implementation, the data collection 180 may be internal to the physical machine 120; may be external to the physical machine 120; or may be distributed inside and outside of the physical machine 120.

In accordance with example implementations, the databases 184 may be relational databases that store data organized in tables, where the data of each table is organized in rows and columns; and the physical machine 120 may be used to form at least part of an RDBMS. In accordance with example implementations, the queries 130 may originate with physical machines 160 that are coupled to the physical machine 120 via network fabric 150. As examples, the queries 130 may correspond to query statements that are dynamically generated by applications that execute on the physical machines 160, may be generated by users specifically crafting the query statements by according to a particular query language construct (e.g., according to a SQL standard), may be generated by graphical user interfaces (GUIs) and/or command line interfaces of the physical machines 160 in response to users supplying parameters for the queries 130, and so forth. As depicted in FIG. 1, in accordance with example implementations, the network fabric 150 may further couple the physical machine 120 (and query processor 139) to the data collection 180 so that the query processor 139 may, for a given query request 130, execute operations to perform the action(s) with the data collection 180 corresponding to the request 130.

In accordance with example implementations, one or multiple hardware processor(s) 122 execute machine-readable instructions 125 (or "software") that are stored in the memory 124 to form components of the query processor 139, such as a parser engine 140 (or "parser"), optimizer engine 144 (or "optimizer") and execution engine 148 (or "executor"). In general, the parser engine 140 processes an incoming query 130 to identify the different elements of the query 130, such as keywords, commands, constants, parameters, relations, and so forth. The optimizer engine 144 determines a query plan for the query 130, which sets forth a sequence of operations to be performed; and the execution engine 148 executes the operations to provide the corresponding query result 131.

In accordance with example implementations, the optimizer engine 144 includes components to optimize the processing of star schema-based queries: a dimension table selection optimizer 145 and a join order optimizer 147. In accordance with example implementations, the optimizer engine 144 may include optimizers to optimize queries other than star schema-based queries. In general, the star schema-based query may be directed to a fact table and one or multiple dimension tables.

The dimension table selection optimizer 145 identifies combinations of dimension tables of a particular query, where each combination covers all or most of the columns of the primary key of the fact table. The dimension table selection optimizer 145, for each combination, determines costs that are associated with table subsets of the combination for purposes of identifying the table subset that has the lowest associated cost. Upon identifying the dimension table subset that has the lowest associated costs, a corresponding combination of dimension tables is also identified. In this manner, the optimizer engine 144 includes this combination of dimension tables in the query plan, and the combination of dimension tables is accordingly joined with the fact table.

The identification of the subset of dimension tables is used by the query optimizer engine 144 for purposes of identifying the specific dimension tables (i.e., the dimension tables of the subset) that are joined in the query plan before the fact table. After the subset of dimension tables and corresponding combination of dimension tables are identified, the join order optimizer 147 applies join enumeration for purposes of determining the optimal join order of the subset of dimension tables.

In accordance with example implementations, the dimension table selection optimizer 145 determines the cost for a particular subset of dimension tables in terms of resource costs to process the join of the subset with the fact table. In accordance with example implementations, a resource cost may be based on a weighted combination (e.g., a summation) of weighted metrics, such as a number of estimated CPU cycles, a bandwidth of input/output (I/O) associated with processing the join, a cardinality (i.e., the expected rows or records resulting from the joining of the tables) associated with processing the join, as well as other and/or different metrics.

Figure 2:
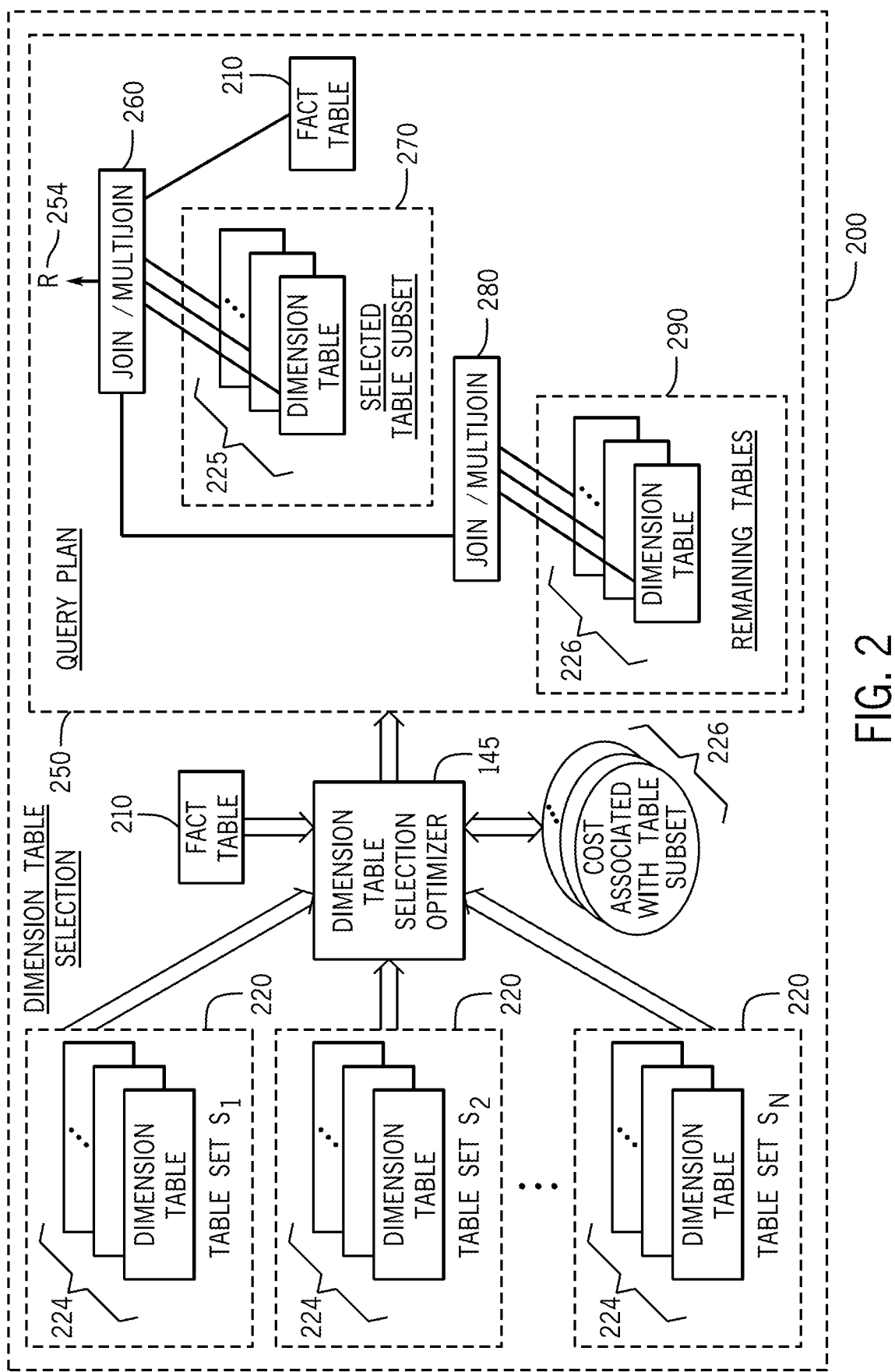
FIG. 2 is an illustration of construction of a query plan by the dimension table selection optimizer of FIG. 1 according to an example implementation.

FIG. 2 is an illustration 200 depicting generation of a query plan 250 by the dimension table selection optimizer 145, in accordance with some implementations. Referring to FIG. 2 in conjunction with FIG. 1, in accordance with example implementations, the dimension table selection optimizer 145, for a given query 130 statement that is directed to a star schema pattern, identifies a fact table 210 and dimension tables 224. In accordance with some implementations, the dimension table selection optimizer 145 may identify the fact table 210 as being the largest table targeted by the query 130. Multiple dimension tables 224 may cover the same column or columns of the primary key of the fact table 210. Therefore, in accordance with example implementations, the dimension table selection optimizer 145 groups the dimension tables 224 in different combinations, or table sets 220. FIG. 2 depicts N table sets 220 having corresponding labels of "$S_1$," "$S_2$," to "$S_N$." Each table set 220 represents a unique set of dimension tables 224 that cover the primary key of the fact table 210. Moreover, in accordance with example implementations, for a given table set 220, no two dimension tables 224 cover the same column(s) of the fact table's primary key.

In general, the dimension table selection optimizer 145 identifies subsets (i.e., groups of dimension tables 224) of each table set 220 for purposes of identifying, or determining, the particular subset that has the lowest associated cost. A particular subset may include all of the dimension tables 224 of the corresponding table set 220 or a number of dimension tables 224 of the corresponding table set 220 less than all of the subset's dimensions tables 224. The dimension table selection optimizer 145 instructs the query plan 250 to contain the corresponding table set 220 containing the identified subset, and the dimension table selection optimizer 145 constrains the query plan 250 such that the identified subset is placed before the fact table 210.

The query plan 250 is a tree that includes a root node 254 and additional nodes that correspond to different operators. Moreover, the leaves of the tree represent relations, which here, are tables, such as dimension tables 225 and 226 (as described herein) and the fact table 210. For the particular example that is depicted in FIG. 2, the query plan 250 includes nodes 260 and 280 that each correspond to a particular join or multiple join 260 and 280. "Multi-join" refers to a join of more than two tables. The join/multijoin node 260 represents an operator to join a selected subset 270 of a particular table set 220 (i.e., one of the table sets 220 $S_1$ to $S_N$). The selected subset 270 includes a group (all or few than all) of the dimension tables 224 of the particular table set 220, and the dimension tables of the selected subset 270 are individually referred to by reference numeral "225." The join/multijoin node 280 represents an operator to join remaining tables 290 of the dimension tables 224 of the particular table set 220. Here, the remaining tables 290 may include zero, one or multiple dimension tables 224 of the particular table set 220, which are not part of the selected table set 270. For the illustration of FIG. 2, the dimension tables of the remaining tables 290 are individually referred to by reference numeral "226."

The join order optimizer 147 may, in accordance with example implementations, determine the particular order in which the dimension tables 225 of the selected subset 270 are joined. Moreover, in accordance with example implementations, the join order optimizer 147 may further determine the join order for the dimension tables 226 for the remaining tables 290 of the selected subset.

Figure 3A:
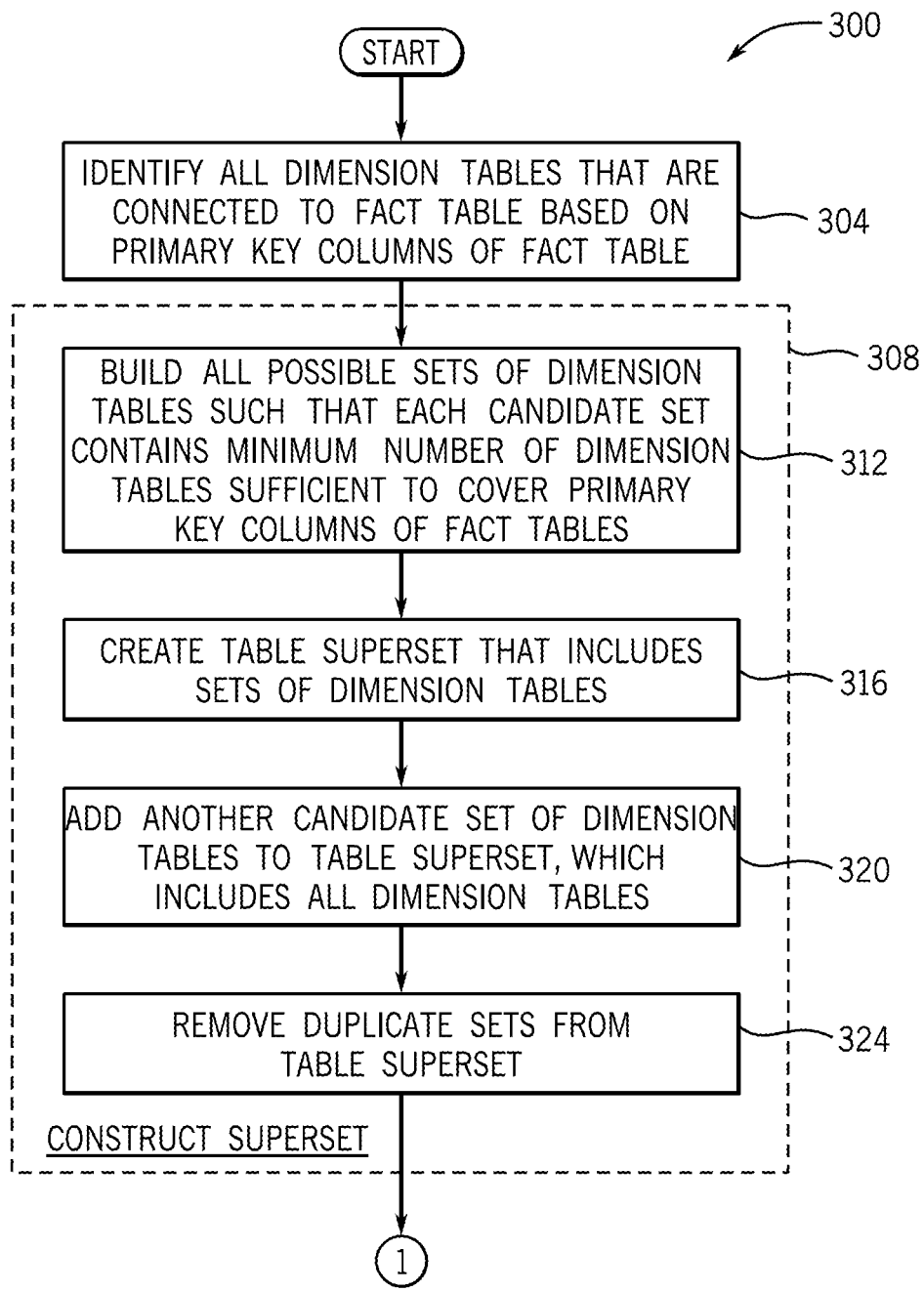
FIGS. 3A and 3B are flow diagrams depicting a process used by the dimension table selection optimizer of FIG. 1 to determine a query plan to process a star schema-based query according to an example implementation.
Figure 3B:
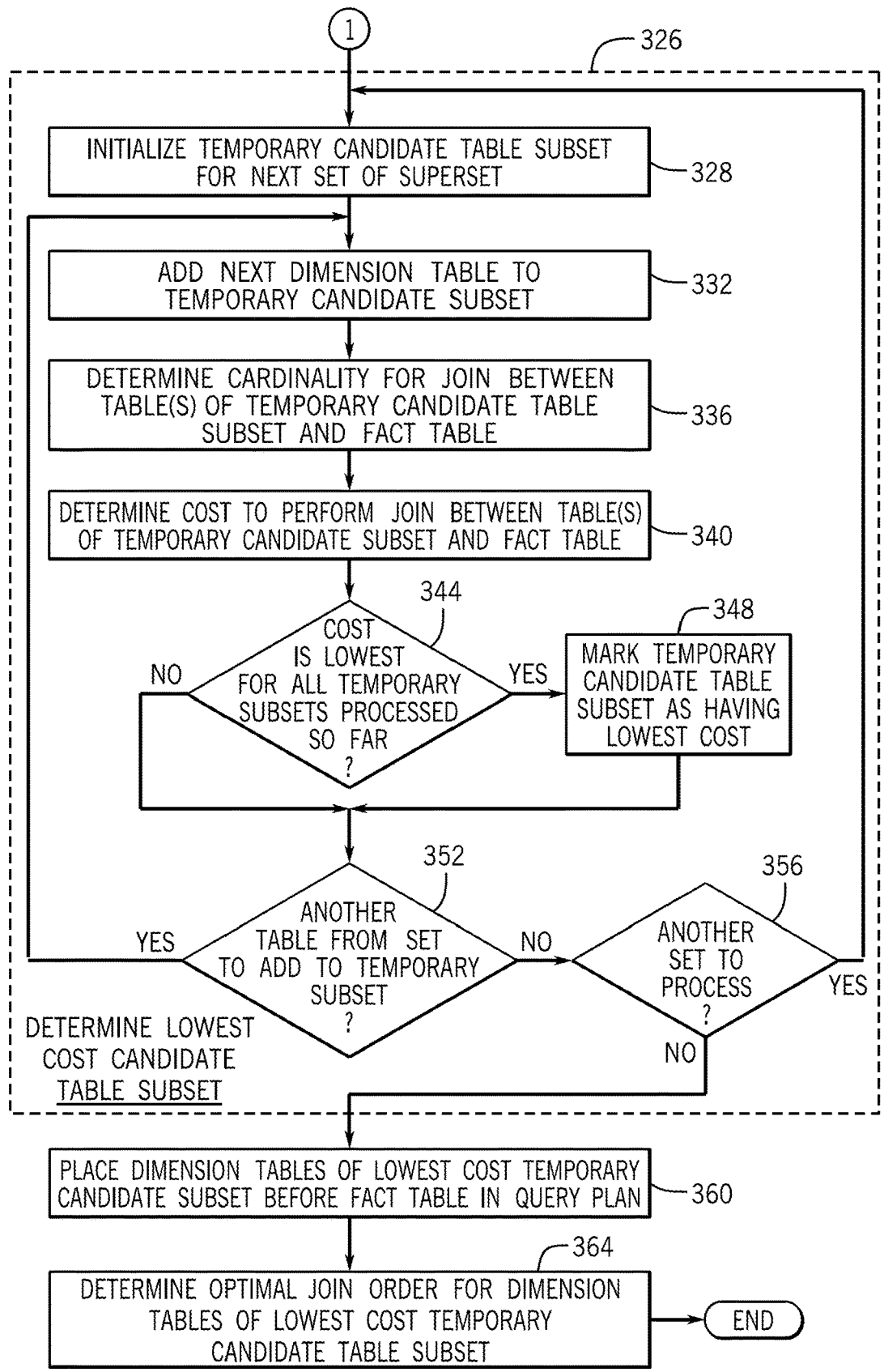

As a more specific example, FIGS. 3A and 3B depict a process 300 that may be performed by the optimizer engine 144 of FIG. 1 in accordance with example implementations. Referring to FIG. 3A in conjunction with FIG. 1, the process 300 includes identifying (block 304) all dimension tables that are connected to a fact table based on primary key columns of the fact table. Next, the process 300 includes constructing a superset, pursuant to block 308. This construction includes blocks 312, 316, 320 and 324 of FIG. 3A. Pursuant to block 312, the process 300 includes building all possible sets of dimension tables such that each set contains a minimum group of dimension tables sufficient to cover the primary key columns of the fact table. A superset is then created, pursuant to block 316, to include these sets of dimension tables. As depicted in block 320, the process 300 includes creating another set of dimension tables that includes all dimension tables, and this set is added to the superset. Pursuant to block 324, the process 300 includes removing duplicate set(s) from the superset.

Referring to FIG. 3B in conjunction with FIG. 1, next, the process 300 includes determining (block 326) a temporary subset of dimension tables having the lowest associated cost. This determination includes blocks 328, 332, 336, 340, 344, 348, 352 and 356 and is an iterative subprocess of the process 300, which evaluates different candidate temporary subset combinations. More specifically, pursuant to block 328, the process 300 initializes the temporary subset for the next corresponding set of the superset. For this initialization, in accordance with example implementations, the temporary subset is initially set to have no dimension tables. Next, the process 300 includes adding (block 332) the next dimension table of the set to the temporary subset.

The process 300 includes determining (block 336) a cardinality for a join between the dimension table(s) of the temporary subset and the fact table. In this context, determining the cardinality for the join includes estimating the number of records, or rows, returned in the final result for the join. The process 300 includes, based on the cardinality, determining (block 340) a cost to perform the join between the dimension table(s) of the temporary subset and the fact table. In accordance with example implementations, determining the cost may include determining a weighted combination of metrics, as described herein.

In accordance with example implementations, the process 300 next includes determining (decision block 344) whether the determined cost is the lowest cost for all of the temporary subset(s) that have been processed so far in block 326. If the cost is the lowest cost, then the current temporary subset is marked (block 348) as having the lowest associated cost. The process 300 includes next making a determination (decision block 352) whether there is another dimension table from the current set to add to the temporary subset, and if so, control returns to block 332 to add another dimension table. Otherwise, if there is no additional dimension table to add to the temporary subset, then a determination is made (decision block 356) whether there is another temporary subset to process. If so, control returns to block 328.

Otherwise, block 326 is complete, and the temporary subset that has the lowest associated cost has been determined. Pursuant to block 360, the dimension tables of the lowest cost temporary subset is placed before the fact table in the query plan, and an optimal join order (e.g., the best join order) for the dimension tables of the lowest cost temporary subset is determined, pursuant to block 364.

Figure 4:
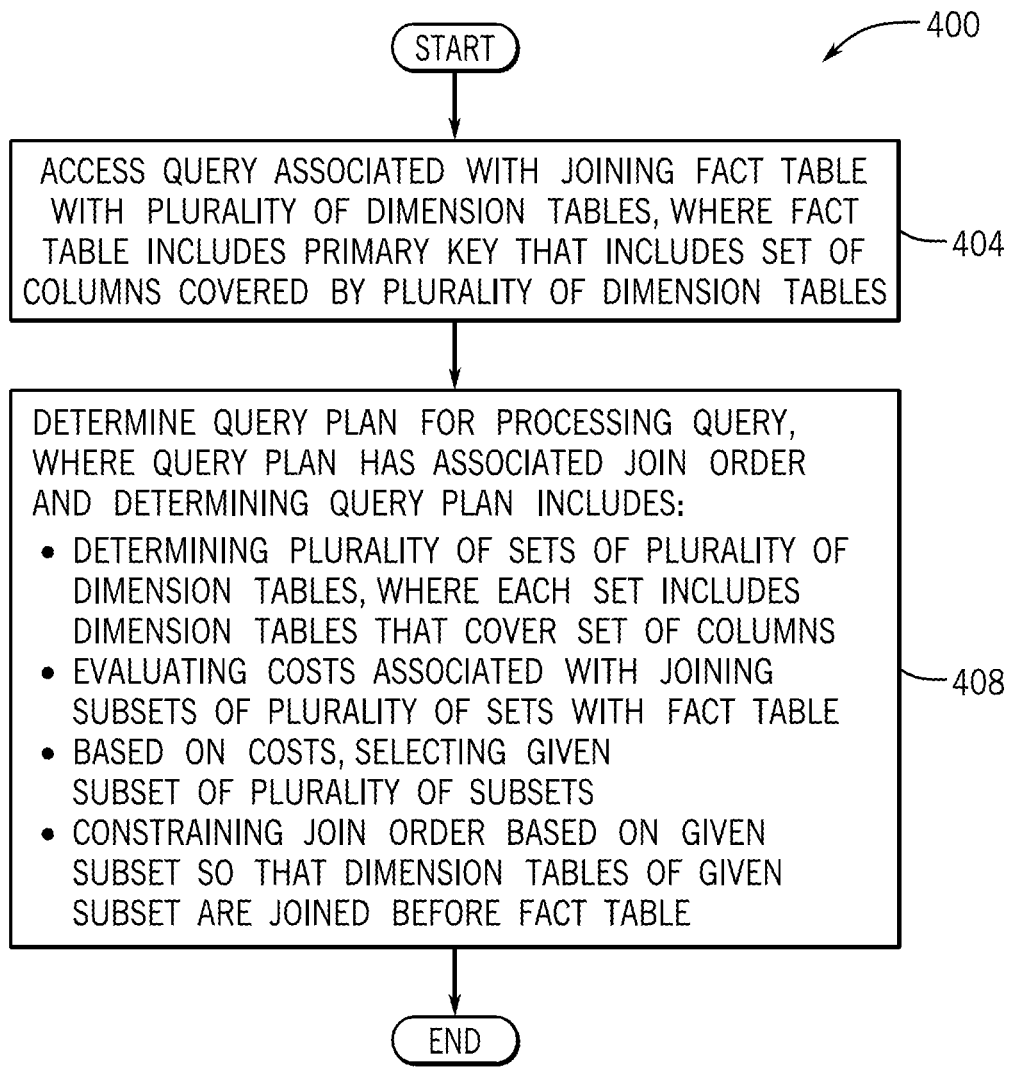
FIG. 4 is a flow diagram depicting a technique to determine a query plan for a query according to an example implementation.

Referring to FIG. 4, in accordance with example implementations, a query that is associated with joining a fact table with a plurality of dimension tables is accessed, pursuant to block 404. The fact table includes a primary key that includes a set of columns, which are covered by the dimension tables. The process 400 includes determining (block 408) a query plan for processing the query. The query plan has an associated join order. Determining the query plan includes determining a plurality of sets of the plurality of dimension tables, where each set includes dimension tables that cover the set of columns. Determining the query plan includes evaluating costs associated with joining subsets of the plurality of sets with the fact table, and based on the costs, selecting a given subset of the plurality of subsets. Determining the query plan includes constraining the join order based on the given subset so that the dimension tables of the given subset are joined before the fact table.

Figure 5:
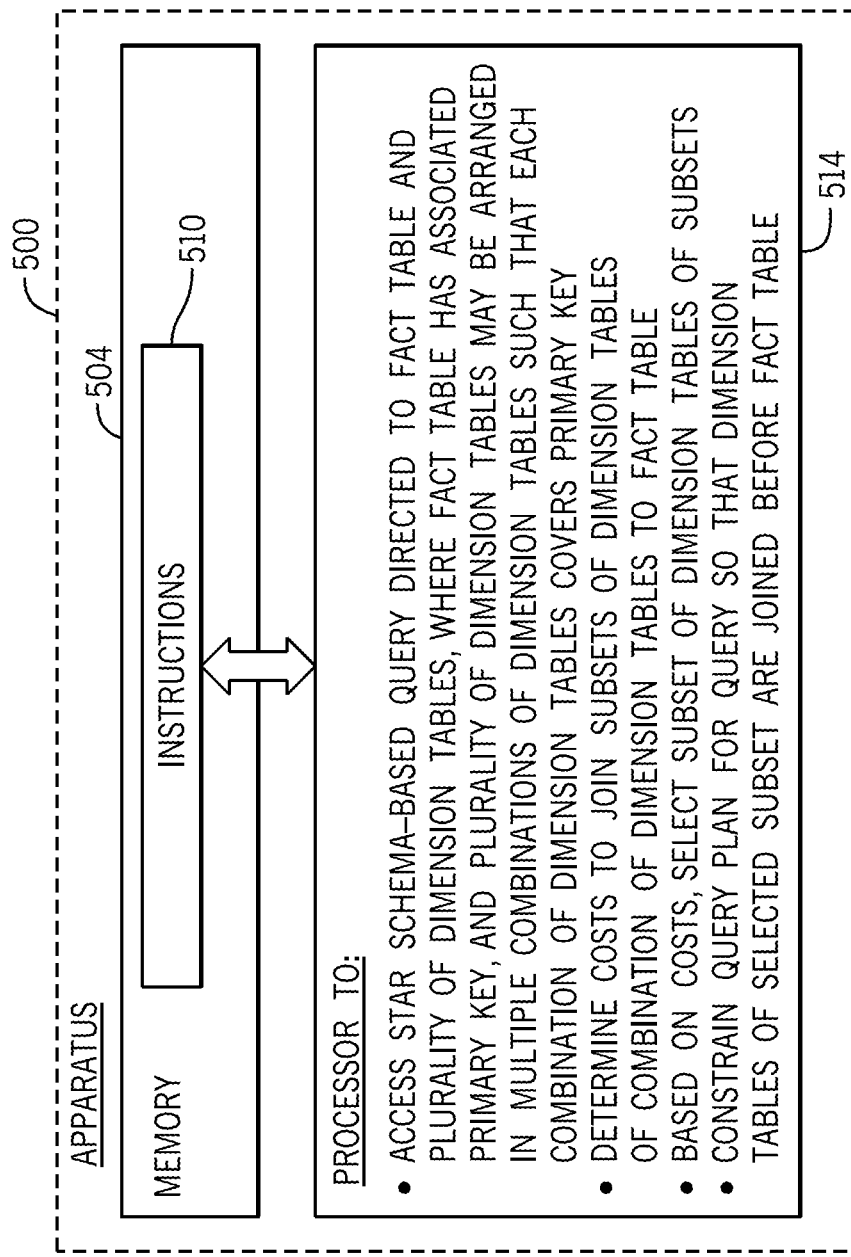
FIG. 5 is a schematic diagram of an apparatus to determine a query plan for a star schema-based query according to an example implementation.

Referring to FIG. 5, in accordance with example implementations, an apparatus 500 includes a processor 514 and a memory 504. The memory 504 stores instructions 510 that, when executed by the processor 514, cause the processor 514 to access a star schema-based query directed to a fact table and a plurality of dimension tables. The fact table has an associated primary key. The plurality of dimension tables may be arranged in multiple combinations of dimension tables such that each combination of dimension tables covers the primary key. The instructions 510, when executed by the processor 514, further cause the processor 514 to determine costs to join subsets of dimension tables of the combination of dimension tables to the fact table. The instructions 510, when executed by the processor 514, further cause the processor to, based on the costs, select a subset of dimension tables of the subsets of dimension tables, and constrain a query plan for the query so that the dimension tables of the selected subset are joined before the fact table.

Figure 6:
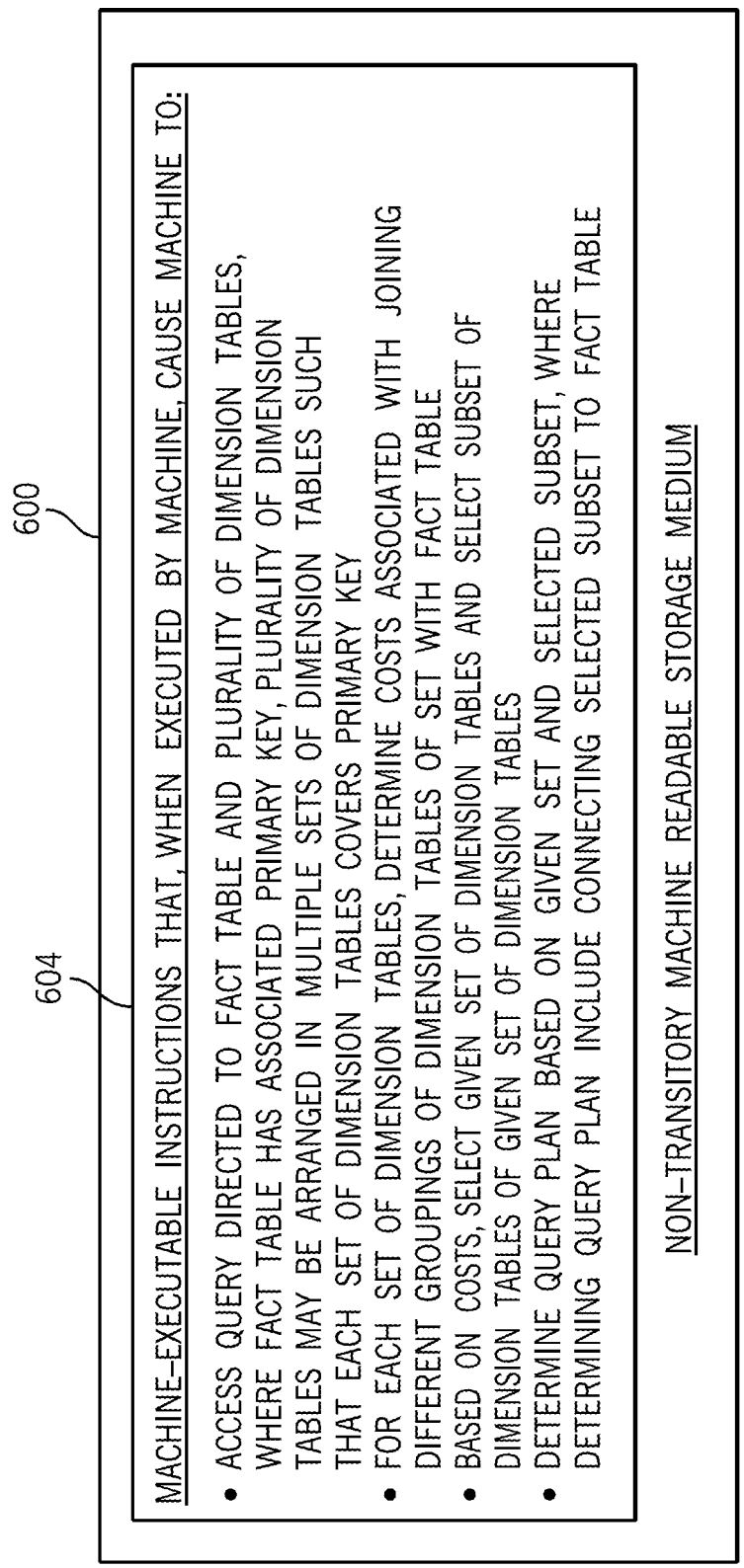
FIG. 6 is an illustration of machine-executable instructions stored on a non-transitory storage medium, which, when executed, cause a machine to determine a query plan for a star schema-based query according to an example implementation.

Referring to FIG. 6, in accordance with example implementations, a non-transitory storage medium 600 stores machine-executable instructions 604 that, when executed by a machine, cause a machine to access a query directed to a fact table and a plurality of dimension tables. The fact table has an associated primary key. The plurality of dimension tables may be arranged in multiple sets of dimension tables such that each set of dimension tables covers the primary key. The instructions 604, when executed by the machine, further cause the machine to, for each set of dimension tables, determine costs associated with joining different groupings of the dimension tables of the set with the fact table. The instructions 604, when executed by the machine, further cause the machine to, based on the costs, select a given set of dimension tables and select a subset of dimension tables of the given set of dimension tables. The instructions 604, when executed by the machine, further cause the machine to determine a query plan based on the given set of dimension tables and the subset of dimension tables, where determining the query plan includes connecting the selected subset to the fact table.

In accordance with example implementations, a join order may be determined for the dimension tables of the given subset. Particular advantages include conserving resources and processing time in determining an optimal query plan for processing a star schema query.

In accordance with example implementations, determining the plurality of sets includes determining all of the dimension tables and a set of the plurality of sets. Particular advantages include conserving resources and processing time in determining an optimal query plan for processing a star schema query.

In accordance with example implementations, the primary key includes a column not covered by any of the dimension tables. Particular advantages include conserving resources and processing time in determining an optimal query plan for processing a star schema query.

In accordance with example implementations, evaluating the cost includes, for a given set of the plurality of sets, determining a first cost associated with joining a first subset of dimension tables of the given set to the fact table; combining a dimension table of the given set to the first set to form a second subset; and determining a second cost associated with joining the second subset of dimension tables of the given set to the fact table. Particular advantages include conserving resources and processing time in determining an optimal query plan for processing a star schema query.

In accordance with example implementations, evaluating the costs includes determining a cardinality corresponding to a given join of a subset of the plurality of subsets with the fact table. Determining the cardinality includes determining a number of records that the given join provides responsive to the query. Evaluating the costs further includes determining a cost associated with the given join based on the cardinality. Particular advantages include conserving resources and processing time in determining an optimal query plan for processing a star schema query.

In accordance with example implementations, determining the cost includes determining a computational cost associated with processing the given join to produce the number of records. Particular advantages include conserving resources and processing time in determining an optimal query plan for processing a star schema query.

In accordance with example implementations, the computational cost includes at least one of the following cost components: a number of central processing unit (CPU) cycles, a resource allocation for transferring input/output (I/O) data, or a resource allocation for transferring data with a memory, a resource allocation for evaluating a predicate of the query. Particular advantages include conserving resources and processing time in determining an optimal query plan for processing a star schema query.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A computer-implemented method comprising:
   accessing, by a computer, a star schema-based query associated with joining a fact table with a plurality of dimension tables in a database, wherein the fact table comprises a primary key comprising a set of columns covered by the plurality of dimension tables; and
   generating, by the computer, a query plan for processing the query, wherein the query plan has an associated join order and the generating of the query plan comprises:
      determining a plurality of sets of the plurality of dimension tables, wherein each set of the plurality of sets comprises dimension tables that cover the set of columns in the primary key;
      evaluating costs associated with joining subsets of the plurality of sets with the fact table; and
      based on the costs, selecting a given subset of dimensional tables of the plurality of subsets with a lowest cost;
   constraining, by the computer, the associated join order based on the given subset by placing the given subset before the fact table in the query plan; and
   executing, by the computer, the query plan to access the database, wherein the query plan comprises joining the dimension tables in the given subset to generate a result set before joining the result set with the fact table and then joining the remaining dimension tables in the plurality of dimension tables with the fact table.

2. The method of claim 1, further comprising:
   determining a join order for the dimension tables of the given subset.

3. The method of claim 1, wherein determining the plurality of sets comprises including all of the dimension tables in a set of the plurality of sets.

4. The method of claim 1, wherein the primary key comprises a column not covered by any of the dimension tables.

5. The method of claim 1, wherein evaluating the cost comprises, for a given set of the plurality of sets:
   determining a first cost of the costs associated with joining a first subset of dimension tables of the given set to the fact table;
   combining a dimension table of the given set to the first subset to form a second subset; and
   determining a second cost of the costs associated with joining the second subset of dimension tables of the given set to the fact table.

6. The method of claim 1, wherein evaluating the costs comprises:
   determining a cardinality corresponding to a given join of a subset of the plurality of subsets with the fact table, wherein determining the cardinality comprises determining a number of records that the given join provides responsive to the query; and
   determining a cost associated with the given join based on the cardinality.

7. The method of claim 6, wherein determining the cost comprises determining a computational cost associated with processing the given join to produce the number of records.

8. The method of claim 7, wherein the computational cost comprises at least one of the following cost components: a number of central processing unit (CPU) cycles, a resource allocation for transferring input/output (I/O) data, or a resource allocation for transferring data with a memory, a resource allocation for evaluating a predicate of the query.

9. An apparatus comprising:
   a hardware processor; and
   a memory to store instructions that, when executed by the hardware processor, cause the hardware processor to:
      access a star schema-based query directed to a fact table and a plurality of dimension tables in a database, wherein the fact table has an associated primary key, and wherein the plurality of dimension tables are arranged in multiple combinations of dimension tables such that each combination of of the multiple combinations of dimension tables covers the primary key;
      generate a query plan for processing the query, wherein the query plan has an associated join order and the generating of the query plan comprises:
         determining costs to join subsets of dimension tables of each combination of dimension tables to the fact table;
         based on the costs, select a subset of dimension tables of the subsets of dimension tables with a the lowest cost;
      constrain the associated join order based on the selected subset by placing the selected subset before the fact table in the query plan; and
      execute the query plan to access the database, wherein the query plan comprises joining the dimension tables in the selected subset to generate a result set before joining the result set with the fact table and then joining the remaining dimension tables in the plurality of dimension tables with the fact table.

10. The apparatus of claim 9, wherein the instructions, when executed by the processor, further cause the processor to, for a given combination of the multiple combinations:
    determine a first cost of the costs associated with joining a first subset of the subsets of the given combination to the fact table;
    combine a dimension table of the given combination to form a second subset of the subsets; and determine a second cost of the costs associated with joining the second subset to the fact table.

11. The apparatus of claim 9, wherein the instructions, when executed by the processor, further cause the processor to:
determine a cardinality corresponding to a given join of the subsets with the fact table, wherein determining the cardinality comprises determining a number of records that the given join provides responsive to the query; and
determine a cost associated with the given join based on the cardinality.

12. The apparatus of claim 11, wherein the instructions, when executed by the processor, further cause the processor to determine a computational cost associated with the processing the given join to produce the number of records.

13. The apparatus of claim 9, wherein the instructions, when executed by the processor, further cause the processor to:
determine a computational cost associated with processing the given join to produce the number of records based on a combination of at least two of the following cost components:
a number of central processing unit (CPU) cycles, a resource allocation for transferring input/output (I/O) data, or a resource allocation for transferring data with a memory, a resource allocation for evaluating a predicate of the query.

14. The apparatus of claim 9, wherein the instructions, when executed by the processor, further cause the processor to determine a join order of the dimension tables of the selected subset.

15. A non-transitory storage medium to store instructions that, when executed by a machine, cause the machine to:
access a star schema-based query directed to fact table and a plurality of dimension tables in a database, wherein the fact table has an associated primary key, wherein the plurality of dimension tables are arranged in multiple sets of dimension tables such that each set of the multiple sets of dimension tables covers the primary key;
generate a query plan for processing the query, wherein the query plan has an associated join order and the generating of the query plan comprises:
for each set of dimension tables of the multiple sets of dimension tables, determining costs associated with joining different groupings of dimension tables of the set of dimension tables with the fact table;
based on the costs, selecting a given set of dimension tables and selecting a subset of dimension tables of the given set of dimension tables with a lowest cost;
constraining the associated join order by placing the subset of dimension tables before the fact table; and
execute the query plan to access the database, wherein the query plan comprises joining the dimension tables in the selected subset to generate a result set before joining the result set with the fact table and then joining the remaining dimension tables in the plurality of dimension tables with the fact table.

16. The storage medium of claim 15, wherein the instructions, when executed by the machine, further cause the machine to determine a join order for the selected subset of the dimension tables.

17. The storage medium of claim 16, wherein a given set of the multiple sets includes all of the dimension tables of the plurality of dimension tables.

18. The storage medium of claim 15, wherein a given set of the multiple sets comprises a minimum group of dimension tables of the plurality of dimension tables sufficient to cover the primary key.

19. The storage medium of claim 15, wherein the primary key comprises a column not covered by any of the plurality of dimension tables.

20. The storage medium of claim 15, wherein the instructions, when executed by the machine, further cause the machine to:
determine a cardinality for a given join of a subset of the subsets with the fact table; and
determine a given cost of the costs based on the cardinality.

* * * * *